United States Patent
Mishra et al.

(10) Patent No.: US 11,797,408 B2
(45) Date of Patent: Oct. 24, 2023

(54) DYNAMIC PREDICTION OF SYSTEM RESOURCE REQUIREMENT OF NETWORK SOFTWARE IN A LIVE NETWORK USING DATA DRIVEN MODELS

(71) Applicant: Juniper Networks, Inc., Sunnyvale, CA (US)

(72) Inventors: Sanjeev Kumar Mishra, Bangalore (IN); Ankur Neog, Bangalore (IN); Ramakrishnan Rajagopalan, Banglore (IN); Ravindran Thangarajah, Bangalore (IN); Shamantha Krishna K G, Chikkamagaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/646,559

(22) Filed: Dec. 30, 2021

(65) Prior Publication Data
US 2023/0214304 A1    Jul. 6, 2023

(51) Int. Cl.
*G06F 11/273* (2006.01)
*G06F 11/27* (2006.01)
*G06F 11/267* (2006.01)

(52) U.S. Cl.
CPC ........ *G06F 11/2733* (2013.01); *G06F 11/267* (2013.01); *G06F 11/27* (2013.01)

(58) Field of Classification Search
CPC ..... G06F 11/2733; G06F 11/267; G06F 11/27
See application file for complete search history.

(56) References Cited

U.S. PATENT DOCUMENTS

| | | | | |
|---|---|---|---|---|
| 7,792,770 B1 * | 9/2010 | Phoha | ................. | G06K 9/6284 706/45 |
| 9,600,386 B1 * | 3/2017 | Thai | ...................... | H04L 67/10 |

(Continued)

FOREIGN PATENT DOCUMENTS

| | | | | |
|---|---|---|---|---|
| EP | 3528435 A1 * | 8/2019 | ............. | G06F 30/20 |
| EP | 3823215 A1 * | 5/2021 | ......... | H04L 41/0631 |

(Continued)

OTHER PUBLICATIONS

Dimitropoulos "Creating Realistic BGP Models" 11th IEEE/ACM International Symposium on Modeling, Analysis and Simulation of Computer Telecommunications Systems, 2003. MASCOTS 2003., Oct. 27, 2003, 7 pp.

(Continued)

*Primary Examiner* — Matthew M Kim
*Assistant Examiner* — Indranil Chowdhury
(74) *Attorney, Agent, or Firm* — Shumaker & Sieffert, P.A.

(57) ABSTRACT

In general, a device comprising a processor and a memory may be configured to perform various aspects of the techniques described in this disclosure. The processor may conduct, based on configuration parameters, each of a plurality of simulation iterations within the test environment to collect a corresponding plurality of simulation datasets representative of operating states of the network device. The processor may perform a regression analysis with respect to each of the plurality of configuration parameters and each of the plurality of simulation datasets to generate a light weight model representative of the network device that predicts an operating state of the network device. The processor may output the light weight model for use in a computing resource restricted network device to enable prediction of the operating state of the computing resource restricted (Continued)

network device when configured with the configuration parameters. The memory may store the light weight model.

14 Claims, 4 Drawing Sheets

(56) References Cited

U.S. PATENT DOCUMENTS

| | | | |
|---|---|---|---|
| 10,268,232 B2 * | 4/2019 | Harris | G06E 3/006 |
| 10,360,214 B2 * | 7/2019 | Gold | G06N 3/08 |
| 10,560,481 B2 * | 2/2020 | Ouyang | H04L 63/102 |
| 10,599,957 B2 * | 3/2020 | Walters | G06N 5/02 |
| 10,649,988 B1 * | 5/2020 | Gold | G06N 20/00 |
| 11,093,666 B2 * | 8/2021 | Minwalla | H04L 43/50 |
| 11,157,723 B1 * | 10/2021 | Shah | G06V 40/50 |
| 2009/0106012 A1 * | 4/2009 | Liu | H04L 63/20 |
| | | | 703/21 |
| 2009/0204692 A1 * | 8/2009 | Smith | H04L 41/5009 |
| | | | 709/221 |
| 2015/0063350 A1 * | 3/2015 | Sundaram | H04L 45/74 |
| | | | 370/389 |
| 2016/0371599 A1 | 12/2016 | Nicholas et al. | |
| 2017/0103103 A1 * | 4/2017 | Nixon | G06F 16/2471 |
| 2017/0207986 A1 * | 7/2017 | Sundaram | H04L 43/062 |
| 2018/0018590 A1 * | 1/2018 | Szeto | G16H 40/20 |
| 2018/0248905 A1 * | 8/2018 | Côté | G06N 3/08 |
| 2019/0258753 A1 | 8/2019 | Minwalla et al. | |
| 2019/0258754 A1 * | 8/2019 | Minwalla | H04L 41/142 |
| 2019/0258756 A1 * | 8/2019 | Minwalla | H04L 41/145 |
| 2020/0134461 A1 * | 4/2020 | Chai | G06N 3/088 |
| 2020/0322226 A1 * | 10/2020 | Mishra | H04L 41/0895 |
| 2022/0036610 A1 * | 2/2022 | Wang | G06F 3/08 |
| 2022/0210009 A1 * | 6/2022 | A | H04L 41/0816 |
| 2022/0400124 A1 * | 12/2022 | Chasdai | H04L 63/1425 |
| 2022/0407841 A1 * | 12/2022 | Karpowicz | H04L 63/0263 |
| 2023/0015965 A1 * | 1/2023 | Reynolds | H04W 24/06 |
| 2023/0069177 A1 * | 3/2023 | Albright | G06F 11/3447 |
| 2023/0128792 A1 * | 4/2023 | Kuen | G06V 10/454 |
| | | | 382/282 |
| 2023/0139135 A1 * | 5/2023 | Soulhi | H04L 43/16 |
| | | | 370/254 |

FOREIGN PATENT DOCUMENTS

| | | | | |
|---|---|---|---|---|
| WO | WO-03039070 A2 * | 5/2003 | | H04L 41/0645 |
| WO | WO-2022033804 A1 * | 2/2022 | | |

OTHER PUBLICATIONS

Raghavan et al. "Realistic Topology Modeling for the Internet BGP Infrastructure" 2008 IEEE International Symposium on Modeling, Analysis and Simulation of Computers and Telecommunication Systems, Sep. 8-10, 2008, 8 pp.

Mammeri "Reinforcement Learning Based Routing in Networks: Review and Classification of Approaches" in IEEE Access, vol. 7, Apr. 29, 2019, 35 pp.

Extended Search Report from counterpart European Application No. 22163036.1 dated Jul. 8, 2022, 10 pp.

Nazir et al., "Assessing and augmenting SCADA cyber security: A survey of techniques", Computers & Security, vol. 70, Elsevier Ltd., Jul. 2017, pp. 436-454.

* cited by examiner

DYNAMIC PREDICTION OF SYSTEM RESOURCE REQUIREMENT OF NETWORK SOFTWARE IN A LIVE NETWORK USING DATA DRIVEN MODELS

TECHNICAL FIELD

The invention relates to computing devices and, more particularly, to modeling of computing devices.

BACKGROUND

Test beds attempt to replicate environments in which a device may be deployed. For example, a test bed may attempt to replicate a network in which a network device, such as a router, may be deployed. In the networking context, the test bed may include, to provide a few examples, a number of different routers, switches, and end-user equipment, such as cable modems, digital subscriber line (DSL) modems, personal computers, smart phones or other cellular handset devices, wireless access points, and the like.

Network administrators may configure the test bed to implement various services, provisioning a device under test (i.e., the above noted router in this example) to support the various services. During the test, the network administrators may collect information regarding how the device under test performed in an attempt to understand how the device under test should be configured and how many of the devices under test should be deployed within the network to successfully implement the services.

Test beds may facilitate a better understanding of devices under test, while also allowing for detailed data collection of various operating parameters of the device under test while configured to support the various services. Such detailed data collection may allow for extensive modelling of the device under test, possibly enabling the creation of virtual device under test that facilitates prediction of resource utilization in different network environments. However, the models representative of the virtual device under test may consume significant computing resources (e.g., processor cycles, memory, memory bus bandwidth, etc.).

SUMMARY

Techniques are described for enabling automated modeling of devices under test (DUT) using test environments (or, in other words, test beds) that produce models of the device under test that are lightweight in terms of computing resource utilization. The models formed through extensive application of machine learning that may consume significant computing resources (e.g., processor cycles, memory, memory bus bandwidth, etc.). Furthermore, such machine learning models are difficult to update quickly as devices under test change (e.g., due to upgraded hardware, software, etc.). To potentially overcome this computing resource utilization and model upgrade difficulty, application of regression analysis to both configuration parameters for the device under test to facilitate simulation and operational states of the device under test during simulation may allow for linear, non-linear, variable, etc. relationships to be established that are capable producing a light weight (LW) model that is capable of being executed by computing resource constrained devices (e.g., network devices, such as routers, switches, hubs, etc.; field programmable gate arrays—FPGAs; application specific integrated circuits—ASICs, virtual machines, and the like).

Extending the execution of the models by way of development of LW models allows for deployment of the LW models in certain resource constrained devices to facilitate certain use cases. For example, a router may deploy a LW model to predict computing resource consumption for not yet committed configuration data. The router may then commit the configuration data if the predicted resource utilization does not exceed resource utilization thresholds. Otherwise, the router may deny committing the configuration data if the predicted resource utilization exceeds one or more of the resource utilization thresholds, thereby preventing misconfiguration of the router that may lead to faulty operation, failure, etc.

As such, various aspects of the techniques described in this disclosure may improve operation of network devices themselves. Network devices may, for example, execute (on-device given the low computing resources consumed) the LW model to predict, based on the configuration data, resource utilization prior to committing configuration data. Executing the LW model on-device may establish another layer of security to prevent misconfiguration prior to committing complicated configuration data that may be arriving from multiple different network administrators. The network devices may thereby prevent misconfiguration of the network device that may result in faulty operation (e.g., due to computing resource overutilization), network traffic drops (e.g., again due to computing resource overutilization), and/or failure. Given that most network devices are incapable of executing machine learning models due to lack of sufficient computing resources to execute complicated machine learning models, application of the LW model may thereby improve operation of the network devices themselves.

In one aspect, various aspects of the techniques are directed to a method of automating model creation for a network device, the method comprising: conducting, by the one or more processors and based on configuration parameters for the network device, each of a plurality of simulation iterations within a test environment to collect corresponding operational data representative of an operating state of the network device; performing, by the one or more processors, a regression analysis with respect to each of the plurality of configuration parameters and each of the plurality of simulation datasets to generate a light weight model representative of the network device that predicts, responsive to the configuration parameters for the network device, an operating state of the network device when configured with the configuration parameters for the network device, the light weight model configured to consume, during execution of the light weight model, less computing resources compared to execution of a model generated using machine learning with respect to the configuration parameters and the corresponding operational data; and outputting, by the one or more processors, the light weight model for use in a computing resource restricted network device to enable prediction of the operating state of the computing resource restricted network device when configured with the configuration parameters.

In another aspect, various aspects of the techniques are directed to a device configured to automate model creation for a network device, the device comprising: one or more processors configured to: conduct, based on configuration parameters, each of a plurality of simulation iterations within the test environment to collect a corresponding plurality of simulation datasets representative of operating states of the network device; perform a regression analysis with respect to each of the plurality of configuration parameters and each of the plurality of simulation datasets to generate a light weight model representative of the network device that predicts, responsive to configuration parameters for the network device of the configuration parameters, an operating state of the network device when configured with the configuration parameters for the network device, the light weight model configured to consume, during execution of the light weight model, less computing resources compared to execution of a model generated using machine learning with respect to the configuration parameters and each of the plurality of simulation datasets; and output the light weight model for use in a computing resource restricted network device to enable prediction of the operating state of the computing resource restricted network device when configured with the configuration parameters; and a memory configured to store the light weight model.

In another aspect, various aspects of the techniques are directed to a non-transitory computer-readable storage medium having stored thereon instructions that, when executed to perform model creation for a network device, cause one or more processors to: conduct, based on configuration parameters, each of a plurality of simulation iterations within the test environment to collect a corresponding plurality of simulation datasets representative of operating states of the network device; perform a regression analysis with respect to each of the plurality of configuration parameters and each of the plurality of simulation datasets to generate a light weight model representative of the network device that predicts, responsive to configuration parameters for the network device of the configuration parameters, an operating state of the network device when configured with the configuration parameters for the network device, the light weight model configured to consume, during execution of the light weight model, less computing resources compared to execution of a model generated using machine learning with respect to the configuration parameters and each of the plurality of simulation datasets; and output the light weight model for use in a computing resource restricted network device to enable prediction of the operating state of the computing resource restricted network device when configured with the configuration parameters.

In another aspect, various aspects of the techniques are directed to a A system comprising: a computing device comprising: one or more processors configured to: conduct, based on configuration parameters, each of a plurality of simulation iterations within the test environment to collect a corresponding plurality of simulation datasets representative of operating states of a first network device; perform a regression analysis with respect to each of the plurality of configuration parameters and each of the plurality of simulation datasets to generate a light weight model representative of the first network device that predicts, responsive to configuration parameters for the first network device of the configuration parameters, an operating state of the first network device when configured with the configuration parameters for the first network device, the light weight model configured to consume, during execution of the light weight model, less computing resources compared to execution of a model generated using machine learning with respect to the configuration parameters and each of the plurality of simulation datasets; and output the light weight model for use in a computing resource restricted network device to enable prediction of the operating state of the computing resource restricted network device when configured with the configuration parameters; and a memory configured to store the light weight model; and a second network device deployed in an operating environment in support of delivery of one or more services, the second network device comprising: an interface configured to receive configuration parameters; and one or more processors configured to: execute the light weight model to obtain, based on the configuration parameters, predicted operating state of the second network device; determine if the predicted operating state exceeds one or more operating state thresholds; and commit the configuration parameters only if the predicted operating state does not exceed the one or more operating state thresholds.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
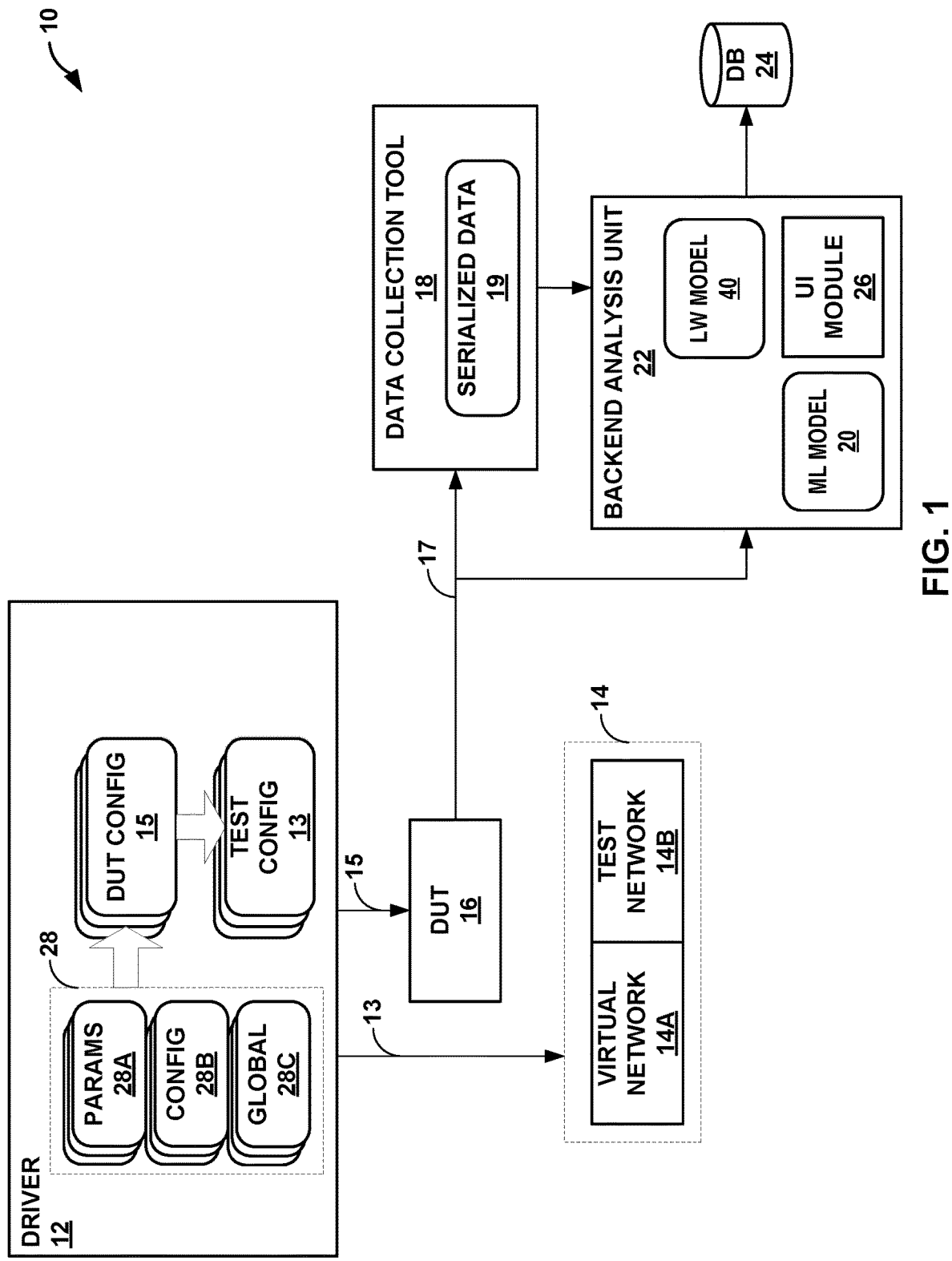
FIG. 1 is block diagram of an example network modeling environment configured to perform various aspects of the modeling techniques described in this disclosure.

FIG. 1 is a block diagram illustrating a modeling environment 10 configured to perform various aspects of the modeling techniques described in this disclosure. As shown in the example of FIG. 1, modeling environment 10 includes a driver 12, a test environment 14 (which may also be referred to as a "test bed 14"), a device under test (DUT) 16, a data collection tool 18, a machine learning (ML) model 20, a backend analysis unit 22, and a database (DB) 24.

Driver 12 may represent a unit configured to automate testing of DUT 16 within test bed 14. Driver 12 may automate configuration of test bed 14 and DUT 16 such that DUT 16 operates in coordination with test bed 14 to implement one or more services or perform one or more operations. For example, in the context of computer networks, DUT 16 may represent a router or other network device (e.g., an L2, L3, or L2/L3 switch; route reflector; gateway; or service gateway). As shown in the example of FIG. 1, test bed 14 includes a combination of a virtual network 14A and a hardware-based test network 14B. Driver 12 may configure test bed 14 to implement one or more routing services, such as layer three virtual private network (L3VPN) services, layer 2 virtual private network services such as Ethernet VPN (EVPN) and Virtual Private WAN/LAN Service, multicast, and other routing services. Driver 12 may further configure test bed 14 to communicate with DUT 16 for routing protocol sessions, management protocol sessions, other communication sessions. Driver 12 may also configure DUT 16 to support the implementation of the routing services and communication sessions, such as those listed above.

Test bed 14 may represent any type of test environment. Although described with respect to virtual network 14A and test network 14B, test bed 14 may include only virtual network 14A or only test network 14B, or additional networks 14A-14B, and should not be limited to the combination shown in the example of FIG. 1. Furthermore, although shown as providing various forms of networks for testing network devices, test bed 14 may represent any platform suitable for testing any types of devices, including personal computers, laptop computers, cellular phones (including so-called "smart phones"), digital watches (including so-called "smart watches"), speakers (including so-called "smart speakers"), tablet computers, processors, or any other type of electronic device.

DUT 16 may represent a hardware-based device, a virtual device (which may refer to a device implemented as a model executed by a general-purpose computing device), or a combination of the hardware-based device and the virtual device. For purposes of illustration, DUT 16 is assumed to represent a network device, such as a router, and as such may be referred to herein as "router 16." Other types of DUT 16 may include the foregoing example devices, including personal computers, laptop computers, cellular phones (including so-called "smart phones"), digital watches (including so-called "smart watches"), speakers (including so-called "smart speakers"), tablet computers, processors, or any other type of electronic device.

Data collection tool 18 may represent a unit configured to retrieve metrics and other data representative of an operating state of DUT 16. Examples of the data representative of the operating state, when DUT 16 represents a router, include feature usage data and resource utilization data. Feature usage data may include, to provide a few examples, one or more of a number of peers (e.g., border gateway protocol (BGP) peers), a number of groups (e.g., BGP groups), a number of route instances (also referred to as "routing instances"), a number of customer edge (CE) devices, a number of CE interfaces, a number of routes, a type for each of the routes. Resource utilization data may include, to provide a few examples, one or more of central processing unit (CPU) utilization per routing daemon (in a routing engine of the router), memory usage per routing daemon or other control plane application, CPU utilization in a packet forwarding engine (PFE) of the router, and memory usage in the PFE, ternary content addressable memory (TCAM) utilization, etc.

Data collection tool 18 may poll DUT 16 during the modeling process to retrieve the operational data representative of an operational state 17 of DUT 16, where such operational data may also be referred to as "simulation datasets" or "operating state data." Data collection tool 18 may invoke a number of different processes by which to coordinate data collection, including open source processes, such as YAML Ain't Markup Language (YAML™), Spark processes, Spark Kafka processes, and Influx processes to provide a few examples that are discussed in more detail below.

ML model 20 represent a unit configured to model the operating state of DUT 16 relative to a configuration. ML model 20 may, in this respect, present an interface for receiving parameters (e.g., in the networking context, the parameters may include a number of peers, a number of groups, a number of routes, etc., which may be a subset or derived measurements of the feature usage data) and generate predictive data indicative of the operating state of DUT 16. Modeling environment 10 may associate configuration changes with the corresponding collected data representative of the operating states of DUT 16 (which may be referred to as "operational data") in different configurations of the DUT 16 and test bed 14, and perform machine learning or execute other artificial intelligence algorithms to obtain ML model 20, as outlined in more detail below.

Backend analysis unit 22 may represent a unit configured to perform analysis with respect to predictive data generated by ML model 20 and operational data collected by data collection tool 18. Backend analysis unit 22 may include user interface (UI) module 26 that presents the predictive data and the operational data in various formats to facilitate review of DUT 16 and the machine learning model. Backend analysis unit 22 may store the results of the analysis to database 24.

As noted above, backend analysis unit 22 may employ machine learning to create ML model 20. Machine learning may refer to a set of mathematical modeling processes that allow a computer to learn without being explicitly programmed. For example, machine learning may include Monte Carlo simulation style experimentation. Machine learning for purposes of device modeling may require large amounts of operational data with a high amount of entropy (or, in other words, randomness) relative to other types of modeling algorithms. For accurate model creation, machine learning may employ real world data, but such real-world data is often difficult to collect due to privacy and other concerns. Furthermore, machine learning may require data from most if not all available parameter configurations, which may become increasingly difficult in multi-dimensional configuration in which there are multiple parameters with multiple different settings to successfully configure a single service, such as in network devices like routers.

Given the foregoing, most attempts to model multi-dimensional devices have attempted to use different modeling algorithms that do not require extensive real-world data, and/or high levels of randomness in operational data. These models however fail to accurately predict real-world device operation beyond providing rudimentary estimates of operating states relative to feature usage data. The accuracy of the estimates is mostly insufficient, and do not facilitate extensive network planning, or more generally, capacity planning. Furthermore, model development in this way is not automated, nor can such modeling create a model quickly enough to facilitate quality assurance or other aspects of device development or troubleshooting.

Modeling environment 10 may automate configuration of DUT 16 in a highly random manner. Modeling environment 10 may next automate configuration of test environment 14 in a manner that supports the existing services configured to be provided by DUT 16. Moreover, modeling environment 10 may also automate configuration of test environment 14 in a highly random manner using parameters that reflect real world values to facilitate Monte Carlo simulation style experimentation. Modeling environment 10 may then conduct a simulation of DUT 16 within testing environment 14, and automate operational data collection. Model environment 10 may iteratively conduct a number of different simulations and collect operational data in a manner that results in large amounts of operational data being collected, which may form the basis upon which to build an accurate ML model 20 (in comparison to the models created using the above noted different modeling algorithms).

In operation, driver 12 may initially obtain parameters 28A ("params 28B"), configuration objects 28B ("config 28B") and global files 28C ("global files 28C"), which collectively may also be referred to as "simulation configuration files 28." In some instances, the simulation configuration files 28 may be defined using YAML™. YAML™ is a cross-language, Unicode based data serialization language designed around common native data types of programming languages. YAML™ defines three basic primitive data structures, which include mappings (e.g., hashes and/or dictionaries), sequences (e.g., arrays and/or lists), and scalars (e.g., strings and/or numbers). From these three primitive data structures, all other data structures in YAML™ may be constructed. YAML™ leverages the primitive data structures, and adds a typing system and aliasing mechanism to form a language for serializing any native data structure. Many agile programming languages, such as Perl, Python, PHP, Ruby, and Javascript, may employ YAML™ to store and transfer data. More information regarding YAML™ can be found in a document by Ben-Kiki, O. et al., entitled "YAML Ain't Markup Language (YAML™)," version 1.2, $3^{rd}$ edition, patched at 2009 Oct. 1, the entire contents of which are incorporated by reference as if set forth in its entirety.

In any event, driver 12 may generate, based on the YAML™ files, different instances of DUT configuration objects 15 ("DUT config 15") for each simulation. To generate the different instances of DUT configuration objects 15, driver 12 may first parse configuration file 28B for a given set of simulation configuration files 28. That is, each set of simulation configuration files 28 may include a parameter file 28A, a configuration file 28A, and a global file 28C. Each set of simulation configuration files 28 may define a different category of simulation of DUT 16 within test environment 14. For example, one set of simulation configuration files may define a L3VPN simulation. Another set of simulation configuration files may define a label switched path (LSP) auto bandwidth simulation, while another simulation configuration file defines a simulation of internal border gateway protocol (iBGP), Intermediate System to Intermediate System (IS-IS) routing protocol, and/or resource reservation routing protocol (RSVP) within an L3VPN service.

Configuration file 28B defines a template by which the different instances of DUT configuration objects 15 are created. The template generally defines the category (or, in other words, type) of simulation, providing the general syntax for enabling creation of DUT configuration objects 15 required to configure DUT 16 to operate according to the particular service, function, or operation being simulated. Configuration file 28B may reference parameter file 28A using a specified syntax.

That is, configuration file 28B may include placeholders in the form of variables (or, in other words, parameters) defined using the specified syntax, which signals to driver 12 that the value specified for the referenced parameter should be pulled from parameter file 28A. Driver 12 may parse parameter file 28A to identify the parameter referenced in configuration file 28B. Driver 12, responsive to identifying the parameter, may process parameter file 28A to determine a value for the corresponding parameter. Parameter file 28A may define the value as one or more ranges, or as a static value. Parameter file 28A may also define the value in terms of a maximum value and minimum value. Driver 12 may randomly select a value from the defined range, and set the value within the DUT configuration objects 15. Using the randomly assigned values for the parameters, driver 12 may create different instances (or, in other words, iterations) of DUT configuration objects 15 that vary in terms of parameter values, thereby injecting high amounts of entropy into the simulations and allowing for accurate model building using Monte Carlo style experimentation.

Configuration file 28B may also hold placeholders in the form of variables that are defined using in a different syntax that signals to the driver 12 that the value specified for the referenced parameter should be pulled from global file 28C. Global file 28C defines parameter values that should be the same between different instances of DUT configuration objects 15 within the same simulation. Global file 28C may also define maximum and minimum parameter values or other global constraints on parameter value selection (so as to avoid issues with certain devices—such as exceeding a maximum number of routes for certain routers, and the like).

After generating an instance of DUT configuration objects 15, driver 12 may generate tester configuration objects 13 in a manner that ensures sufficient randomization between different instances of DUT configuration objects 15 as described in more detail below. Driver 12 may next generate instances of tester configuration objects 13 for test environment 14 to accommodate the operation of DUT 16 when configured according to DUT configuration objects 15.

To illustrate, DUT configuration objects 15 for DUT 16 may configure a particular L3VPN between one client edge (CE) device and another CE device. Driver 12 may specify tester configuration objects 13 for test environment 14 such that the expected two CE devices will execute the routing protocols in a manner that establishes and simulates use of the expected L3VPN provided by the DUT 16. In this respect, driver 12 may define tester configuration objects 13 and DUT configuration objections 15 for coherently configuring test environment 14 and DUT 16 (respectively) such that DUT 16 operates consistent with test environment 14 to support one or more services, i.e., L3VPN service in the above example, operations, or functions.

Similar to generation of DUT configuration objects 15, driver 12 may randomly specify parameter values within tester configuration objects 13 in a manner that reflects actual, or in other words, real-world network environments. To illustrate, rather than assign IP addresses to interfaces within test environment 14 via a logical, ordered manner (e.g., 1.1.1.1 assigned to interface 1, 1.1.1.2 assigned to interface 2, 1.1.1.3 assigned to interface 3, etc.), driver 12 may introduce randomization to IP addresses (e.g., 1.1.1.1 assigned to interface 1, 10.1.0.90 assigned to interface 2, etc.). Driver 12 may, in this way, generate tester configuration objects 13 that include parameters having values randomly assigned to reflect actual environments. As noted above, these input parameters need to vary extensively to reflect real-world environments. In addition to the layer three (L3) addresses, other input parameters that may benefit from high variability may include layer two (L2) media access control (MAC) addresses, route instances, route quantities, number of routing peers, autonomous system numbers, different combinations and numbers of network services, etc. Allocation of parameter values in this manner may promote a more realistic modeling that better reflects the operational state of DUTs 16 compared to models created in artificial ordered test environments.

Driver 12 may, after selecting the subset of different instances of DUT configuration objects 15, interface with DUT 16 to configure DUT 16 according to a first one of the instances of DUT configuration objects 15. Configuration of DUT 16 using an instance of DUT configuration objects 15 is multi-dimensional in the sense that more than one parameter of the instances of DUT configuration objects 15 is different from another instance of DUT configuration objects 15. In other words, DUT configuration objects 15 are not iteratively testing a different value for the same parameter, but instead represent a random selection of parameters having high entropy, which may provide more meaningful results than unidimensional (referring to iteratively changing values of a single parameters) testing.

Driver 12 may next, or concurrent to configuring DUT 16, interface with test environment 14 to configure test environment 14 according to the corresponding one of tester configuration objects 13. Driver 12 may, as one example, simulate and vary via tester configuration objects 13 a number of customer edge (CE) devices and multi-protocol label switching (MPLS) remote provider edge (PE) devices. Additionally, driver 12 may simulate and vary via tester configuration objects 13 a variation in CE protocols, a quantity of routes per CE device and/or remote PE devices, a number of routing instances, Internet protocol (IP) addresses, autonomous system (AS) numbering, subnetting, mask lengths, etc.

Driver 12 may, after configuring DUT 16 and test environment 14, conduct the simulation, whereby driver 12 may interface with test environment 14 to initiate routing protocol operation (e.g., BGP, IS-IS, OSPF, etc.), service execution (e.g., L3VPN), and other network operations so as to test various services, functions, and operations supported by DUT 16. During or current to the simulation, data collection tool 18 may interface with DUT 16 to collect operational data 17 representative of the operating state of DUT 16.

Data collection tool 18 may issue commands and/or other queries to DUT 16 to collect operational data 17. Data collection tool 18 may, for example, issue commands such as "UNIX-TOP" which may result in a per daemon utilization and total memory, a "show bgp summary" command which may result in a summary of BGP peers, a "show bgp groups summary" which may result in a summary of BGP groups, a "show route summary" which may result in a summary of route numbers, a "show route instance" which may result in a number of route instances and types. Data collection tool 18 may, as another example, issues commands such as "show task memory" which may result in control plane memory utilization, a "show chassis fpc" which may result in processor and memory utilization on a flexible PIC (physical interface card) concentrator (FPC) in a data plane. Data collection tool 18 may also, as yet another example, issue a "show jnh <#> pool" command to collect memory utilization for a packet forwarding engine (PFE). Data collection tool 18 may also retrieve or otherwise request from DUT 16 system logs indicative of the operational data 17.

Data collection tool 18 may collect the feature usage data of operational data 17, which may be indicative of the operating state of DUT 16 relative to test environment 14 and include, for example, one or more of a number of peers (e.g., border gateway protocol (BGP) peers), a number of groups (e.g., BGP groups), a number of route instances, a number of customer edge (CE) devices, a number of CE interfaces, a number of routes, a type for each of the routes. Data collection tool 18 may also collect the resource utilization data of operational data 17 indicative of the operating state of DUT 16, which may include central processing unit (CPU) utilization per routing daemon (in a routing engine of the router), memory usage per routing daemon, CPU utilization in a packet forwarding engine (PFE) of the router, and memory usage in the PFE.

Data collection tool 18 may condition operational data 17 to form serialized data 19. That is, data collection tool 18 may process each of the forms of operational data 17 (e.g., the polled data and the system logs) to systematically arrange the data temporally, and thereby generate serialized data 19. Driver 12 and data collection tool 18 may coordinate to collect serialized data 19 iteratively for each of simulation configuration files 28, repeating the foregoing process to collect serialized data 19 for each of simulation configuration files 28. Data collection tool 18 may output serialized data 19 to backend analysis unit 22.

Backend analysis unit 22 may generate, based on serialized data 19, ML model 20. In some examples, backend analysis unit 22 may identify serialized data 19, which is another way of referring to conditioned operational data 17, associated with each of DUT configuration objects 15 for conducting the simulations. DUT configuration objects 15 may represent discrete configuration data associated with a particular type, such as an interface, radius server, routing instance, forwarding information base (FIB), etc. in the context of a router or other network device. Backend analysis unit 22 may determine the associations between DUT configuration objects 15 and different portions of serialized data 19. Based on the associations between DUT configuration objects 15 and different portions of serialized data 19, backend analysis module 22 may generate ML model 20 representative of DUT 16 that predicts, responsive to configuration parameters, the operating state of DUT 16.

For example, serialized data 19 may include, assuming for purposes of illustration that DUT 16 is a router, the above noted resource utilization data, which again may include one or more of processing utilization per routing daemon executed by the router, memory usage per routing daemon executed by the router, processor utilization in a packet forwarding engine (PFE) of the router, and memory usage in the PFE of the router. In this example, the feature usage data of serialized data 19 may define different numbers of peers, groups, route instances, customer edge (CE) devices, CE interfaces, and routes, as well as define a type for each of the routes. Backend analysis unit 22 may identify associations between one or more of the number of peers, the number of groups, the number of route instances, the number of customer edge (CE) devices, the number of CE interfaces, the number of routes, and the type for each of the routes, and one or more of the processing utilization per routing daemon executed by the router, the memory usage per routing daemon executed by the router, the processor utilization in a packet forwarding engine (PFE) of the router, and memory usage in the PFE of the router.

Because model generation requires a certain degree of variability between simulations to ensure a full representation of DUT 16, backend analysis unit 22 may determine a level of similarity between each non-redundant pair of serialized data 19. Although random sampling from the range of each parameter may provide one solution to diversify the operational data collected during each simulation, total randomization is not possible because of the domain logic pre-defined in parameters 28A. That is, certain parameters are biased in terms of their distribution or in other words not statistically random in an equal amount per value.

As such, backend analysis unit 22 may determine the level of similarity between each non-redundant pair of serialized data 19 (where each of the serialized data 19 corresponding to a different iteration of the same simulation), taking into consideration the biased sampling distributions of certain parameter values. Backend analysis unit 22 may select, responsive to a comparison of the level of similarity to a diversity threshold, a subset of serialized data 19. Reference to a "subset" in this disclosure is intended to refer to a "non-zero subset" having less data than the total number of elements in the larger set unless explicitly noted otherwise, and not the strict mathematical definition of a subset that would include zero or more elements of the larger set up to total elements of the larger set. Driver 12 may select the subset of instances of serialized data 19 in order to reduce the bias, and thereby produce a more complete ML model 20 that better predicts, responsive to configuration parameters, the operating state of DUT 16.

In some instances, backend analysis module 22 may perform machine learning with respect to serialized data 19 (e.g., the above identified associations between the feature usage data—which are indicative of DUT configuration objects—of serialized data 19 and the resource utilization data of serialized data 19) to generate ML model 20 representative of DUT 16. Backend analysis module 22 may first perform data cleaning during which backend analysis module 22 may complete missing values and filter outlying values for serialized data 19. Backend analysis module 22 may also aggregate some data (e.g., to determine a total number of routes across different routing protocols). Backend analysis module 22 may next perform feature engineering during which backend analysis module 22 may separate serialized data 19 into different categories and normalize each category of serialized data 19. Backend analysis module 22 may perform model calibration with respect to each category of serialized data 19 for different sub-models, including linear and nonlinear sub-models. Backend analysis module 22 may, after calibrating each sub-model, perform model validation, including k-folder cross validation and forward chaining validation.

The sub-models may each predict a specific one of the above noted categories of the operating state of DUT 16. That is, a first sub-model may predict a processing utilization per routing daemon executed by the router, a second sub-model may predict memory usage per routing daemon executed by the router, a third sub-model may predict processor utilization in a packet forwarding engine (PFE) of the router, and a fourth sub-model may predict memory usage in the PFE of the router. In some instances, a given sub-model may predict two or more of the foregoing operational states of DUT 16. In any event, the collection of sub-models may form a machine learning model.

During model validation, backend analysis unit 20 may input an instance of DUT configuration objects 15 and/or other configuration data for DUT 16—which may be referred to generally as configuration parameters—into ML model 20 to generate predictive operational data, and compare the predictive operational data to corresponding operational data 17 collected for the same instance of DUT configuration objects 15. When ML model 20 generates predictive operational data within a threshold level of similarity to actual operational data 17, backend analysis unit 20 may validate the as being sufficiently similar to DUT 16 such that it may be deployed for predictive analysis. Backend analysis unit 22 may then iteratively input configuration objects into ML model 20 to collect predictive operational data reflective of the predicted operating state of DUT 16, storing the predictive operational data to database 24. Backend analysis unit 22 may include user interface (UI) models 26 by which to interface with database 24 and other visualization tools to interact with the predictive operational data.

In generating ML model 20 that predicts the operating state of DUT 16, modeling environment 10 may allow customers of DUT 16 to better understand the actual capabilities of DUT 16 in terms of resource consumption, thereby allowing customers to better understand existing device deployment. Furthermore, the customers may utilize the model to better understand how many of the corresponding devices having a particular configuration are required to meet expected demand for the configured services. Such modeling may allow customers to better understand device deployment, service deployment per device, and plan device purchases to meet the expected demand. ML model 20 may, in this way, allow for better visibility into both existing and future device deployment within actual environments.

That is, ML model 20 allows customers to understand how services impact DUT 16 and other services executed within DUT 16 from a resource consumption perspective. Moreover, ML model 20 allows customers to better understand which services most affect performance and/or scale. ML model 20 may furthermore reveal defects of DUT 16, such as memory leaks, in an automated way, and thereby may facilitate quality assurance, while also verifying performance and providing a detailed understanding of updates to the operating system of DUT 16. ML model 20 may also predict convergence given a particular configuration state. Additionally, ML model 20 may provide guidance regarding placement of customer drops onto edge networks. More information regarding ML model 20 and model generation may be found in U.S. Pat. No. 11,093,666, entitled "AUTOMATED NETWORK DEVICE MODEL CREATION USING RANDOMIZED TEST BEDS," filed Mar. 22, 2018, the contents of which are hereby incorporated by reference as if set forth entirely herein.

In this respect, test beds 14 may facilitate a better understanding of DUT 16 and allow for detailed data collection of various operating parameters (as operational data 17) of DUT 16 when configured to support various services. Such detailed data collection may allow for extensive modelling of DUT 16, possibly enabling the creation of virtual device under test (e.g., the machine learning model) that facilitates prediction of resource utilization in different network environments.

However, ML model 20 representative of the virtual device under test may consume significant computing resources (e.g., processor cycles, memory, memory bus bandwidth, etc.) when executed, rendering it unsuitable for deployment within an actual operating environment. As noted above, ML model 20 facilitates device deployment planning, offline quality assurance, performance validation, etc. that take place outside of actual operating environments, such as, in the case of a service provider, an operating service provider network. ML model 20 is unsuitable for deployment in operating environments as resources in network devices supporting operating environments are dedicated to supporting service delivery in the operating environment and not available for use in inefficient execution of complex machine learning models. Network devices supporting operating environment may therefore lack computing resources (and may be referred to a computing resource restricted network devices) necessary to execute complicated ML model 20.

Moreover, ML model 20 itself may be difficult to maintain. ML model 20 requires an extensive amount of input (e.g., the above noted configuration parameters and/or configuration objects) and corresponding output (e.g., operating state 17) in order to properly train ML model 20. Any changes to the hardware and/or software of DUT 16 may require a full repeat of the simulation to collect sufficient input and corresponding output, followed by extensive machine learning to create a complicated (from a computing resource consumption perspective) updated version of ML model 20. As interactions between hardware and/or software development have continued to decrease, maintaining ML model 20 in a fully updated capacity becomes difficult.

In accordance with various aspects of the techniques described in this disclosure, modeling environment 10 may enable automated modeling of DUT 16 using test environment 14 (or, in other words, test beds 14) that produce lightweight (LW) model 40 of DUT 16 that are lightweight in terms of computing resource utilization (compared to ML model 20). Model 20, formed through extensive configuration and reconfiguration of both test bed 14 and DUT 16, may consume significant computing resources (e.g., processor cycles, memory, memory bus bandwidth, etc.). To potentially overcome this computing resource utilization and model upgrade difficulty, backend analysis unit 22 may perform polynomial regression analysis to both DUT configuration 15 (which may represent configuration parameters specific to DUT 16) for DUT 16 and operational states 17 of DUT 16 during simulation, which may allow for linear, non-linear, etc. relationships to be established that form LW model 40 that is capable of being executed by computing resource constrained devices (e.g., network devices, such as routers, switches, hubs, etc.; field programmable gate arrays—FPGAs; application specific integrated circuits—ASICs, virtual machines; and the like).

In operation, backend analysis unit 22 may perform a regression analysis with respect to DUT configuration 15 and operational data 17 to generate LW model 40 representative of DUT 16 that predicts, responsive to configuration parameters 28 for DUT 16, an operating state of the network device when configured with the same or different instances of the configuration parameters represented by DUT configuration 15. Backend analysis unit 22 may perform any form of regression analysis, including linear regression analysis, non-linear regression analysis (such as polynomial regression analysis), exponential analysis, etc. Regardless of the form of regression analysis performed, backend analysis unit 22 may identify a relationship, expressed as one or more coefficients, between DUT configuration 15 and operational data 17 (which may represent operational states of DUT 16 and therefore also be referred to as "operational states 17"). Backend analysis unit 22 may next configure a regression model using the one or more coefficients to obtain LW model 40.

Selecting a particular form (or multiple particular forms) of regression analysis may require analysis of the inputs (e.g., DUT configuration 15) and the outputs (e.g., operational data 17) of a given test environment, including a type of DUT 16. In the example of modeling environment 10 in which test environment 14 simulates a network and DUT 16 is assumed to represent a network device (i.e., a router in this and other examples throughout this disclosure), backend analysis unit 22 may be configured to perform a polynomial regression analysis with respect to DUT configuration 15 and operational data 17 to generate LW model 40.

In performing a polynomial regression analysis, backend analysis unit 22 may obtain the one or more polynomial coefficients and one or more intercepts that define the relationship between DUT configuration 15 and operational data 17. To achieve certain thresholds of accuracy, backend analysis unit 22 may configure the polynomial regression analysis to solve the relationship between DUT configuration 15 and operational data 17 using a certain number of polynomial coefficients. That is, less polynomial coefficients may only roughly (e.g., with 50% or greater accuracy) predict operational data. Using two or more polynomial coefficients may enable satisfying higher accuracy thresholds (e.g., 80% or above).

Backend analysis unit 22 may iterate through different solutions for the relationship between DUT configuration 15 and operational data 17 until a stated accuracy threshold is achieved, increasing the number of polynomial coefficients until certain results in prediction accuracy can be assured. That is, backend analysis unit 22 may perform the regression analysis to identify the relationship as a fit between DUT configuration 15 and operational data 17 within a threshold accuracy to ensure a stated accuracy. Such threshold accuracy may include multiple levels of threshold accuracy, where certain prediction results (e.g., 97% of prediction results) satisfy a first threshold accuracy of 97% and remaining prediction results (e.g., 3% of prediction results) satisfy a second threshold accuracy of 80%, thereby ensuring that all prediction results satisfy an overall threshold accuracy of 80%. This accuracy assurance may enable reliable execution of LW model 40.

In any event, backend analysis unit 22 may configure a polynomial regression model with the polynomial coefficients (e.g., two polynomial coefficients) to obtain LW model 40. LW model 40 may, as noted above, be configured to consume, during execution of LW model 40, less computing resources compared to execution of ML model 20 with respect to the configuration parameters and the corresponding operational data. Backend analysis unit 22 may then store or otherwise output LW model 40 for use in a computing resource restricted network device to enable prediction of the operating state of the computing resource restricted network device when configured with the configuration parameters. In this way, various aspects of the techniques described in this disclosure may extend the execution of the models by way of development of LW model 40 that allows for deployment of LW model 40 in certain resource constrained devices to facilitate certain use cases, as described in greater detail below with respect to the example of FIG. 2.

Figure 2:
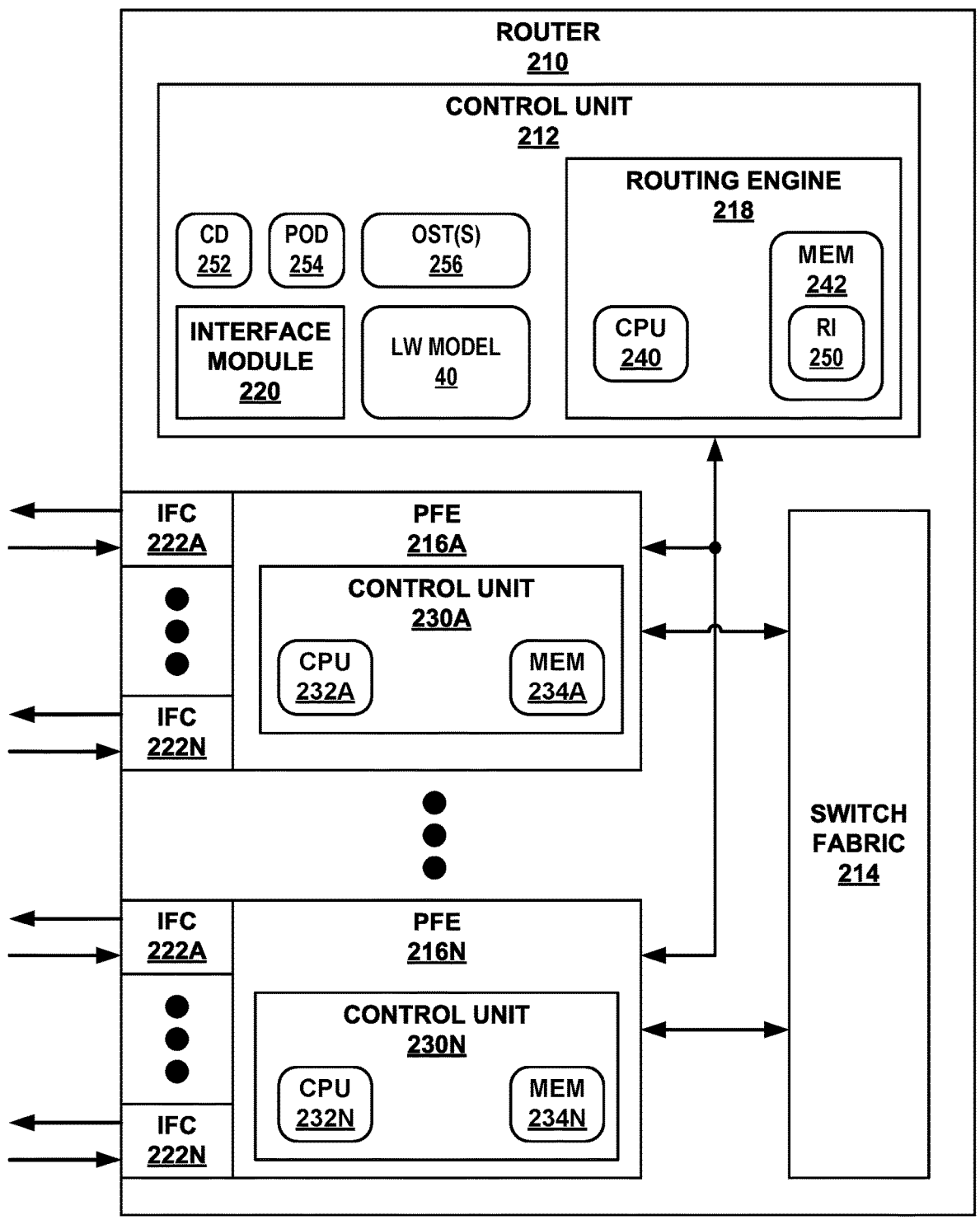
FIG. 2 is a block diagram illustrating an example router representative of a network device deployed in an operating environment that implements various aspects of the techniques described herein.

FIG. 2 is a block diagram illustrating an example router 210 representative of a network device deployed in an operating environment that implements various aspects of the techniques described herein. Although described as router 210 being representative of the network device deployed in the operating environment, router 210 may also represent DUT 16 shown in the example of FIG. 1. It should be understood that any type of DUT, including DUT 16, may represent a network device configured to be deployed in an operating environment, as such DUT 16 should be similar, if not the same, as the device capable of supporting the operating environment to facilitate accurate development of LW model 40.

As shown in the example FIG. 2, router 210 includes a control unit 212, a switch fabric 214 and a plurality of packet forwarding engines (PFEs) 216A-216N ("PFEs 216"). Control unit 212 may represent one or more processors (not shown in FIG. 2) that execute software instructions, such as those used to define a software or computer program, stored to a non-transitory computer-readable medium (again, not shown in FIG. 2), such as a storage device (e.g., a disk drive, or an optical drive), or memory (such as Flash memory, random access memory or RAM) or any other type of volatile or non-volatile memory, that stores instructions to cause, when executed, one or more processors to perform the techniques described herein.

Alternatively, control unit 212 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Often, even when implemented as dedicated hardware, the dedicated hardware supports execution of software that may implement one or more aspects of the techniques described in this disclosure. The techniques may therefore generally be implemented in hardware or a combination of hardware and software.

Control unit 212 includes a routing engine 218 that provides control plane functionality for router 210. Routing engine 226 generally represents a module that provides control plane functions in the form of storing network topology as so-called "routing tables," executing routing protocols to communicate with peer routing devices and thereby maintain and update the routing tables, and providing a management interface to allow user access and configuration of router 210.

This management interface is shown in the example of FIG. 2 as interface module 220. Control unit 212 includes interface module 220 to facilitate communication with router 210. Interface module 220 may represent any common type of interface, including a command line interface (CLI) or a graphical user interface (GUI). Interface module 220 may include any interfaces necessary to interact with components for entering data to router 210. Interface module 220 may also represent, when router 210 represents DUT 16, one or more interfaces by which driver 12 may input device configuration 31, and by which collector 18 may input commands 35 to obtain reports 17 and initiate output of syslogs 37.

Switch fabric 214 provides a high-speed interconnect for forwarding incoming data packets to the correct one of PFEs 216 for transmission over a network, such as the large public network commonly referred to as the "Internet." PFEs 216 receive and send data packets via associated interface cards (IFCs) 222A-222N ("IFCs 222"). IFCs 222 may each represent an interface or port between a communication link and router 210 by which router 210 sends and receives data packets. PFEs 416 may each include one of control units 230A-230N ("control unit 230"), each of which may be similar to control unit 212. Control units 230 may each comprise a combination of dedicated hardware specially designed for packet processing and a central processing unit (CPU) for configuring this dedicated hardware and otherwise enabling communication between routing engine 218 and this dedicated hardware. IFCs 222 and PFEs 216, in combination with switch fabric 214, may form a "data plane" (which may also be referred to as a "forwarding plane") that is responsible for forwarding data packets in accordance with forwarding information. PFEs 216 may each also include one of memories ("MEM") 234A-234N ("MEMs 234").

As shown in the example of FIG. 2, routing engine 218 includes CPU 240 (which may be representative of one or more CPUs 240) and memory 242 ("MEM 242," which also may be representative of one or more memories). Data collection tool 18 may interface with router 210 via interface module 220 to collect operational data 17 indicative of utilization of CPU 240 per routing daemon, and indicative of utilization of MEM 242 per routing daemon. Data collection tool 18 may also interface with router 210 via interface module 220 to collect operational data 17 indicative of utilization of CPUs 232, and indicative of utilization of MEMS 234.

In this way, data collection tool 18 may interface with router 210 to collect operational data 17 indicative of the operational state of router 210 and thereby facilitate construction of a model that may allow for more accurate modeling of router 210. The more accurate model may result in the benefits discussed in detail above that improve network planning and better utilization of existing routers, which may improve performance of the network itself.

As further shown in the example of FIG. 2, routing engine 218 may store (to memory 242) routing information (RI) 250 and configuration data (CD) 252. Routing information 250 describes the topology of the operating environment (e.g., a network) in which router 210 supports services provided by the operating environment and, in particular, routes through the network. Routing information 250 may include, for example, route data that describes various routes within the network, and corresponding next hop data indicating appropriate neighboring devices within the network for each of the routes. Routing information 250 is periodically updated to accurately reflect the topology of the network. In general, router 210 receives a packet via inbound network link and control unit 212 determines the destination address of the packet and outputs the packet on an outbound network link based on the destination.

Control unit 212 may receive configuration input from one or more client devices via interface module 220. Control unit 212 may store the configuration input received from one or more of the client devices as configuration data 252, which may take the form of a text file, such as an ASCII file. Alternatively, control unit 212 may process the configuration input and generate configuration data 252 in any one of a number of forms, such as one or more databases, tables, data structures, or the like.

In any event, responsive to receiving configuration data 252, control unit 212 may invoke LW model 40 to obtain predicted operational data (POD) 254 based on configuration data 252. In some instances, control unit 212 may receive configuration data 252 but refrain from invoking LW model 40 until receiving a particular command (such as a so-called "commit" command) via interface module 220.

Sample psuedocode for lightweight execution of model 40 on target devices follows below as one example.

Sample python script to take coef_intercept.txt (an example of which is reproduced below) and provide lightweight model inferencing service.

```
rpd_resource_predict.py
------------START-------
"""
Extract the below code and copy it
to other file,say <feature.py> and
run as [ python3 feature.py ] to
see the way polynomialfeatures are
generated.
-----------------------------------
row = ['a','b','c','d','e']
#deg = 1
result = [1]
result.extend(row)
```

```
#deg = 2
for i in range(len(row)):
    for j in range(i,len(row)):
        res = row[i]+row[j]
        result.append(res)
print( result,len(result))
----------------------------------
'''
import sys
# Takes list as input and scales
# the feature list to polynomial degree = 2
def poly_2(X):
    result = [1]
    result.extend(X)
    for i in range(len(X)):
        for j in range(i,len(X)):
            res = X[i]*X[j]
            result.append(res)
    return result
# Takes scaled features, co-efficents, intercept
# and predicts the target value, basically does
# the following operation

# predicted_value = (feature * co_efficient) + intercept
def predict(X_poly,coef_,intercept_):
    pred = 0
    if len(X_poly) == len(coef_):
        for i,j in zip(X_poly,coef_):
            pred += i*j
        pred = pred + float(intercept_)
    else:
        print("Error: Co-efficient list length is not matching to Feature list length!")
    return pred
# Extracts the co-efficient list [ coef_ ]
# and intercept [ intercept_ ] from the input file
# Assumption:
#   Input file will be of the format
#------[ coef_and_intercept.txt ]----
#   coef_
#   <coef_1>
#   <coef_2>
#   ...
#   <coef_n>
#   intercept_
#   <intercept_>
#----------------------------------
def extract_coef_and_intercept(file):
    f = open(file,'r')
    l = f.readlines( )
    f.close( )
    l = list(map(lambda s: s.strip( ), l))
    intercept_ind = l.index('intercept_')
    coef = l[1:intercept_ind]
    coef = list(map(float,coef))
    intercept = l[intercept_ind+1]
    return coef, intercept
debug = 0 #flag to enable/disable debug options
co_in = sys.argv[1]
coef_, intercept_ = extract_coef_and_intercept(co_in)
if debug:
    print(coef_)
    print(intercept_)
print("-----------------------------------------------------------------------------------------------------")
print( )
print("     Enter the input features in the form")
active_routes = int(input("   Active routes : "))
bgp_groups    = int(input("   BGP groups    : "))
bgp_peers     = int(input("   BGP peers     : "))
shards        = int(input("   Shards        : "))
update_io     = int(input("   Update-IO     : "))
X = [active_routes, bgp_groups, bgp_peers, shards, update_io]
X_poly = poly_2(X)
print( )
```

```
print(" Predicted RPD RSS (in KB) =",predict(X_poly,coef_,intercept_))
print(" [Predictions from the model will be closer to 19.4 release, as this model
was trained from 19.4 release data]")
  print( )
  print("----------------------------------------------------------------------------------------------
--------------------------------------")
    -----------END-------
```

When invoking LW model 40, control unit 212 may pass configuration data 252 as an input to LW model 40, which LW model 40 may process to obtain predicted configuration data 254. LW model 40 may apply the polynomial regression model configured with the previously determined (based on the regression analysis discussed above with respect to FIG. 1) polynomial coefficients and intercepts to predict operational data 254 within a stated threshold accuracy (e.g., 80% or possibly even higher, such as 95%). LW model 40 may output predicted operational data 254 that represents prediction of an operating state of router 210 relative to changes to the configuration parameters (defined by configuration data 252).

Responsive to receiving predicted operational data 254, control unit 212 may compare predicted operational data 254 to one or more operating state thresholds (OST(s)) 256. Operating state thresholds 256 may be specifically configured to accommodate different device types (e.g., routers, switches, hubs, access points, etc.) or even different versions of the same device type (e.g., an edge router, a core router, and the like) given underlying hardware (or, in other words, computing) resources so as to avoid overutilization of computing resources that may lead to degraded performance and/or failure.

In any event, control unit 212 may determine if predicted operational data 254 exceeds one or more operating state thresholds 256 prior to committing the changes to the configuration parameters. If the predicted operational data 254 exceeds one or more of operating state thresholds 256, control unit 212 may refrain from committing configuration data 252 (which effectively results in not implementing the configuration data 252 within routing engine 218 and elsewhere—such as the forwarding plane). If the predicted operational data 254 does not exceed one or more of operating state thresholds 256, control unit 212 may then commit configuration data 252. As such, control unit 212 may only commit the changes to the configuration parameters (as represented by configuration data 252) when the changes to the configuration parameters are not predicted to result in the operating state of router 210 exceeding operating state thresholds 256.

Extending the execution of the models by way of development of LW model 50 thereby potentially enables deployment of LW model 40 in certain resource constrained devices (such as router 210 in which most computing resources are dedicated to routing) to facilitate certain use cases. For example, router 210 may deploy LW model 40 in the manner noted above to predict computing resource consumption for not yet committed configuration data 252. Router 210 may then commit configuration data 252 if the predicted resource utilization (as represented by predicted operating data 254) does not exceed resource utilization thresholds (as represented by operating state thresholds 256). Otherwise, router 210 may deny committing configuration data 252 if the predicted resource utilization exceeds one or more of the resource utilization thresholds, thereby preventing misconfiguration of router 210 that may lead to faulty operation, failure, etc.

As such, various aspects of the techniques described in this disclosure may improve operation of network devices themselves. Router 210 may, for example, execute (on-device given the low computing resources consumed) LW model 40 to predict, based on configuration data 252, resource utilization prior to committing configuration data 252. Executing LW model 40 on-device may establish another layer of security to prevent misconfiguration prior to committing complicated configuration data 252 that may be arriving from multiple different network administrators (via the above noted client devices and/or network management systems). Router 210 may thereby prevent misconfiguration of router 210 that may result in faulty operation (e.g., due to computing resource overutilization), network traffic drops (e.g., again due to computing resource overutilization), and/or failure. Given that most network devices are incapable of executing machine learning models due to lack of sufficient computing resources to execute complicated machine learning models, application of LW model 40 may thereby improve operation of the network devices themselves.

While described above with respect to router 210, development and deployment of LW model 40 may apply to other contexts. For example, a virtual machine may undergo simulation in the manner described above with respect to a test bed that simulates a data center. Backend analysis unit 22 may then develop a LW model for the virtual machine that can then be deployed to a similar virtual machine for predicting operating states of the virtual machine given changing workflows (or, in other words, tasks), changing network packet flows, changing virtualization schemes, etc. The virtual machine may deploy this LW model to predict resource utilization in order to request that additional resources be allocated in support of the virtual machine, thereby potentially scaling resource utilization automatically across virtual machines so as to enable possibly more efficient utilization of data center resources (in terms of underlying processor utilization, memory utilization, network bandwidth utilization, associated power, etc.). As such, the techniques described above may apply outside of the example networking context described above and may apply to any computing device in which deployment of a LW model may be beneficial for predicting operating state of computing devices without sacrificing extensive underlying computing resources to support such prediction.

Figure 3:
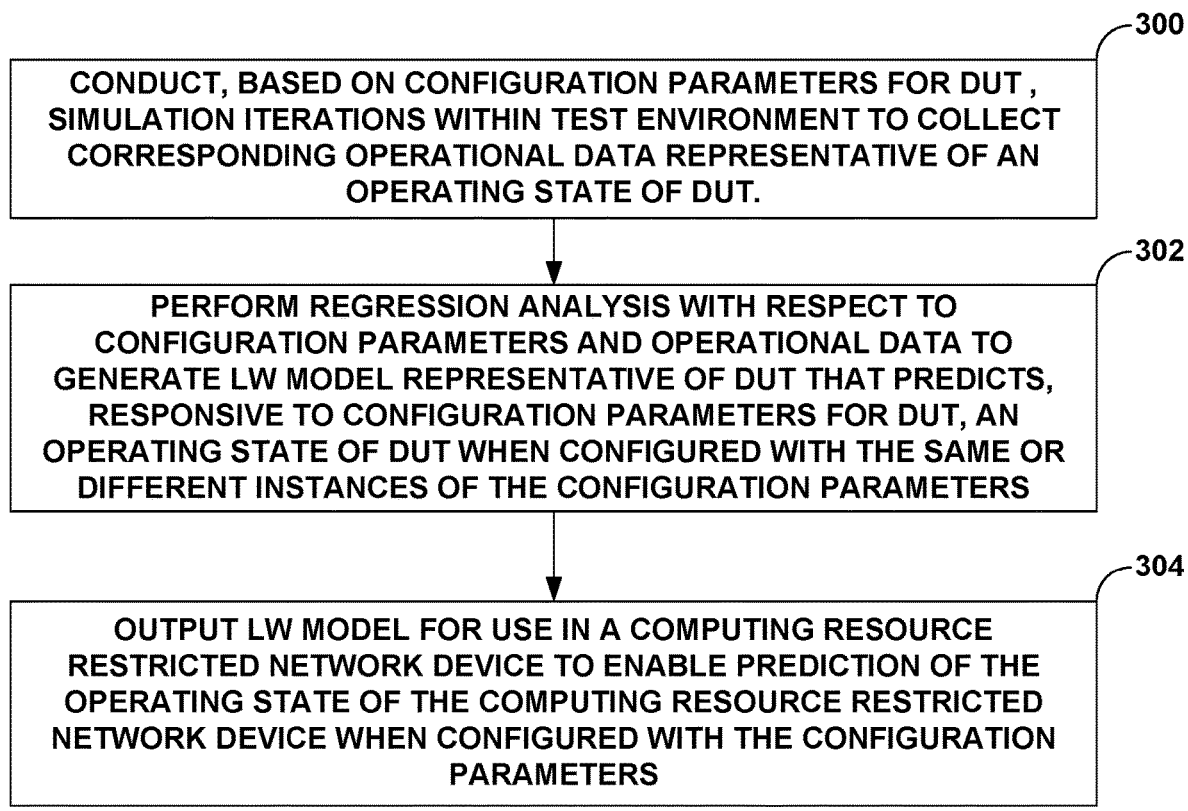
FIG. 3 is a flowchart illustrating example operation of the test system shown in the example of FIG. 1 in obtaining a light weight model for on-device operating state prediction in according with various aspects of the techniques described in this disclosure.

FIG. 3 is a flowchart illustrating example operation of the test system shown in the example of FIG. 1 in obtaining a light weight model for on-device operating state prediction in according with various aspects of the techniques described in this disclosure. Initially, test system 10 may conduct, based on configuration parameters 28 for DUT 16, simulation iterations within test environment 14 to collect corresponding operational data 17 representative of an operating state of DUT 16 (300).

Backend analysis unit 22 may perform a regression analysis with respect to DUT configuration 15 and operational data 17 to generate LW model 40 representative of DUT 16 that predicts, responsive to configuration parameters for DUT 16, an operating state (as represented by operational data 17) of DUT 16 when configured with the same or different instances of the configuration parameters represented by DUT configuration 15 (302). Backend analysis unit 22 may perform any form of regression analysis as noted above. Regardless of the form of regression analysis performed, backend analysis unit 22 may identify a relationship, expressed as one or more coefficients, between DUT configuration 15 and operational data 17 (which may represent operational states of DUT 16 and therefore also be referred to as "operational states 17"). Backend analysis unit 22 may next configure a regression model using the one or more coefficients to obtain LW model 40.

Example pseudocode for effectively translating model 20 into coefficients for equations that produce LW model 40 is shown below.

The below Python script helps extract coefficients and intercepts from the standard model generated in pickle file format.

```
generate_coef_and_intercept_from_pickled_model.py
------------START------
import pandas as pd
import pickle
import sklearn
from sklearn.preprocessing import PolynomialFeatures
def predict(active_routes = 406208,bgp_groups = 4,bgp_peers = 4,shards = 6,update_io = 1):
    model_file = 'rpd_lin_reg_model.sav'
    model = pickle.load(open(model_file,'rb'))
    test_df = pd.DataFrame([[active_routes,bgp_groups,bgp_peers,shards,update_io]]).values
    poly = PolynomialFeatures(degree = 2)
    X_poly = poly.fit_transform(test_df)
    f = open('coef_intercept.txt','w')
    f.write('coef_')
    for i in model.coef_:
        f.write('\n'+str(i))
    f.write('\n'+'intercept_')
    f.write('\n'+str(model.intercept_))
    return model.predict(X_poly)[0]
'''
active_routes = int(input("Active Routes : "))
bgp_groups   = int(input("BGP Groups   : "))
bgp_peers    = int(input("BGP Peers    : "))
shards       = int(input("Shards       : "))
update_io    = int(input("Update I/O   : "))
'''
#print(predict(active_routes,bgp_groups,bgp_peers,shards,update_io))
print(predict( ))
------------END-------
```

While described above with respect to a simulation of values, the values may be predicted by LW model 40 to predict the operating state. In this respect, there are multiple ways of using LW model 40, as the user (e.g., a network administrator) may invoke LW model 40 to predict the operating state from a command line interface or any other interface.

The extracted coefficient and intercepts may resemble the following:

```
------------START----------
   coef_
   0.0
   0.6983823288383693
```

```
   -167.175650449061
   3594.4140676937513
   10789.04665064319
   981.419392849983
   5.18538620704527e-08
   0.0011025353763208195
   0.3854971297757422
   0.024074439192127102
   0.8314773006680882
   -105.33140703170375
   -21.433233390334046
   461.7365041784043
   -178.3386092332355
   -40.50223522972955
   230.86030741156165
   -799.8218368982072
   -961.024467855721
   10789.046650643197
   981.4193928501733
   intercept_
   211769.90850101272
------------END----------
```

Backend analysis unit 22 may iterate through different solutions for the relationship between DUT configuration 15 and operational data 17 until a stated accuracy threshold is achieved, increasing the number of polynomial coefficients until certain results in prediction accuracy can be assured. That is, backend analysis unit 22 may perform the regression analysis to identify the relationship as a fit between DUT configuration 15 and operational data 17 within a threshold accuracy to ensure a stated accuracy. Such threshold accuracy may include multiple levels of threshold accuracy, where certain prediction results (e.g., 97% of prediction results) satisfy a first threshold accuracy of 97% and remaining prediction results (e.g., 3% of prediction results) satisfy a second threshold accuracy of 80%, thereby ensuring that all prediction results satisfy an overall threshold accuracy of 80%. This accuracy assurance may enable reliable execution of LW model 40.

Backend analysis unit 22 may then store or otherwise output LW model 40 for use in a computing resource restricted network device to enable prediction of the operating state of the computing resource restricted network device when configured with the configuration parameters (304). In this way, various aspects of the techniques described in this disclosure may extend the execution of the models by way of development of LW model 40 that allows for deployment of LW model 40 in certain resource constrained devices to facilitate certain use cases, as described in greater detail below with respect to the example of FIG. 2.

Extending the execution of model 20 by way of translation to LW model 40 allows for deployment of LW model 40 in certain resource constrained devices to facilitate certain use cases. For example, a router (which is not shown for ease of illustration purposes) may deploy LW model 40 to predict computing resource consumption for not yet committed configuration data. The router may then commit the configuration data if the predicted resource utilization does not exceed resource utilization thresholds or deny committing the configuration data if the predicted resource utilization exceeds one or more of the resource utilization thresholds. Additional use cases are discussed below.

PFE ASIC Resource Estimation

Packet Forwarding Engine (PFE) ASICs use forwarding constructs (similar to data structures) to perform packet forwarding functions like route lookup, packet filtering, etc.

Forwarding constructs are built using resources present in the ASIC and in memory chips attached to these ASICs. Examples of such resources include:

Off-chip memory to store packet lookup data structures, packet encapsulation strings, firewall filter primitives, counters, etc.

On-chip memory, tables etc.

Off-chip TCAM memory

Amount of resources used in the forwarding plane depends on a variety of factors. The inter-relation between the resource usage and these factors is complex and not easy to model analytically.

PFE Resource 1—Lookup Memory

Used for building the packet lookup tables/trees.

Some factors the amount of lookup memory used depends on are:

Number of route tables of different address families

Number of routes in each table

The distribution of prefixes in each table

The order in which the prefixes are added to the table

Whether load-balancing is enabled for some prefixes, the fan-out for load-balancing Whether route level counters are enabled PFE Resource 2—Nexthop Processing Memory Used to keep all state needed for rewriting layer3—layer1 encapsulation in the packet before it is sent out to the next router/switch Amount of nexthop memory used depends on:

Type of nexthop

Number of nexthops of different types

Type of egress interface (determines layer2/1 encapsulation info)

MPLS labels to be pushed

Other features like: sampling,

A lot of the above depends on higher level factors like:

Number of external interfaces originating from a PFE

Control plane protocols (at transport and service layers) enabled on those interfaces Layer 2 Address Learning Daemon (L2ALD) Memory L2ALD is responsible for creating and managing MAC routes used for Ethernet Bridging functionality L2ALD memory availability is critical for all the L2 bridging functionality supported in the system Handles both local MAC learning (HW based learning of new MAC routes) and control plane driven EVPN MAC learning EVPN MAC learning involves close interaction with Routing Protocol Daemon (RPD)

L2ALD memory usage depends on a lot of factors. Some of the prominent ones are:

Number of Switching/Bridging instances and forwarding tables

Number of active MAC addresses in the tables

MAC Aging Parameters

Per-MAC traffic flows over time

Number of EVPN-based Tables

Number of EVPN-learnt MAC Addresses

In other words, the software resources consumption of a routing engine software can vary greatly based on attributes that contribute to the functionality of the routing protocols. It can be highly advantageous to foresee the consumption pattern beforehand so as to avoid costly overhead that might be incurred if the system is not able to support the resource requirement in a operational network. However, given the number of variables that contribute to the resource consumption and the dynamic addition and omission of the attributes and inter relation between various attributes, these predictions may not be particularly straight forward and can involve complicated computation and analysis. Various aspects of the techniques described herein may efficiently predict the resource consumption of the routing protocol software on a live network using LW model 40.

As an example, memory utilization of RPD processes is provided as a use case for the following reasons:

RPD is a potentially critical part of JUNOS; implements bulk of the control plane May need enough resources (CPU, memory, . . . ) to run smoothly RPD failure due to resource unavailability—far reaching impact on the entire network Among the largest users of system memory RPD memory usage is dependent on many factors which combine in complex ways Memory footprint can change from release to release Memory usage can change due to config changes or changes in other parts of the network Memory usage depends on the scale of certain states present in the overall network Estimating RPD memory usage may help in:

Ensuring that the system can support it for various scenarios below

Ensuring sufficient memory cushion to handle temporary spikes in memory consumptions that happen during network convergence events For eg.: Protocols like BGP, OSPF, etc. going down Estimating RPD memory usage helps in:

Checking whether a software upgrade or config change(s) or change in scale can result in RPD memory usage; and whether it will be within safety margins Various aspects of the techniques described herein thereby potentially address the following:

Introduce a mechanism to calculate routing engine software resource consumption at run time Predict resource utilization at run time.

Figure 4:
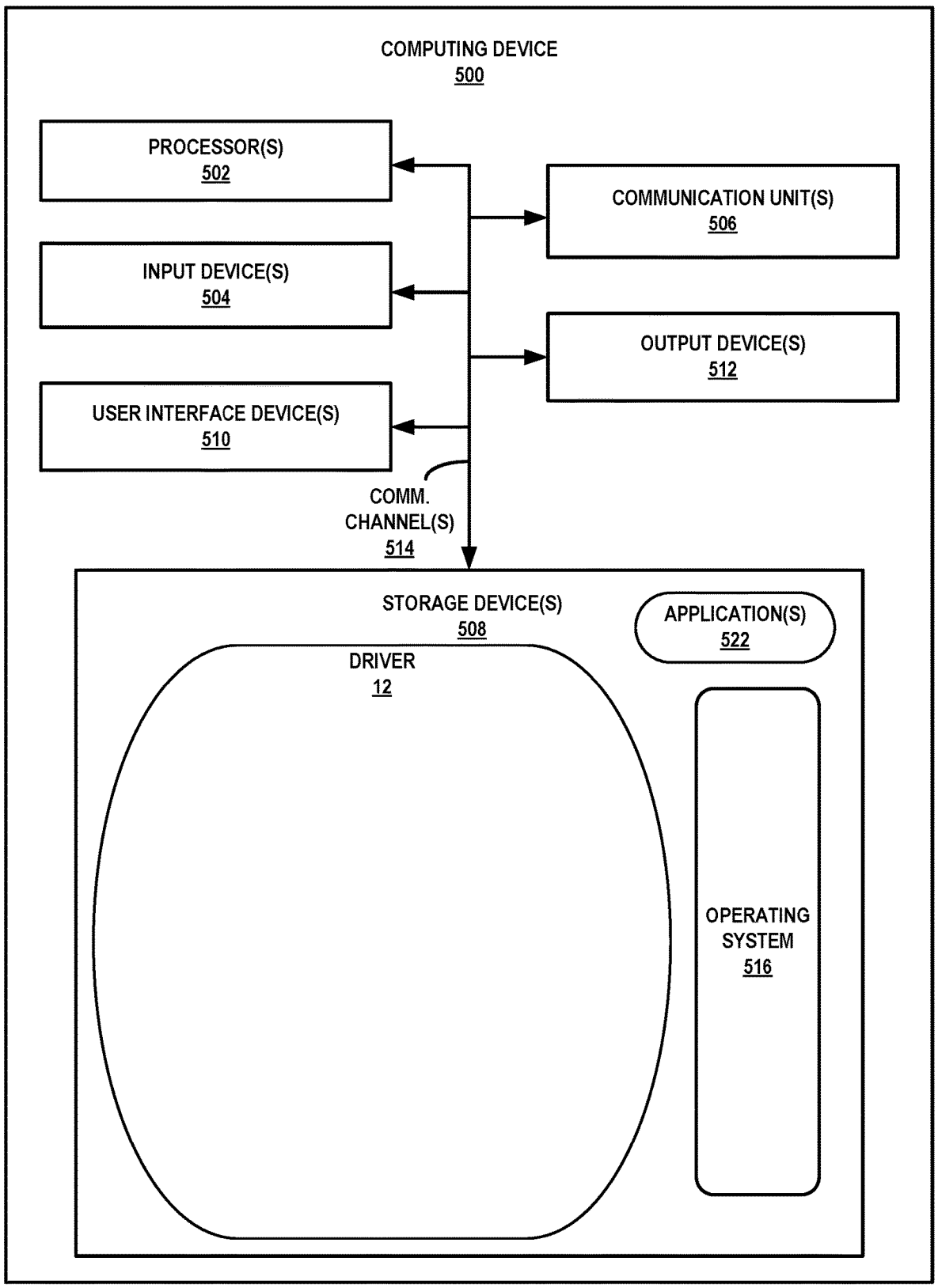
FIG. 4 is a block diagram illustrating further details of one example of a computing device that operates in accordance with one or more techniques of the present disclosure.

FIG. 4 is a block diagram illustrating further details of one example of a computing device that operates in accordance with one or more techniques of the present disclosure. FIG. 4 may illustrate a particular example of a server or other computing device 500 that includes one or more processor(s) 502 for executing any one or more of driver 12, or any other application described herein. Other examples of computing device 500 may be used in other instances. Although shown in FIG. 4 as a stand-alone computing device 500 for purposes of example, a computing device may be any component or system that includes one or more processors or other suitable computing environment for executing software instructions and, for example, need not necessarily include one or more elements shown in FIG. 4 (e.g., communication units 506; and in some examples components such as storage device(s) 508 may not be co-located or in the same chassis as other components).

As shown in the example of FIG. 4, computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, driver 12, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and driver 12 with processors 502, communication unit 506, storage device 508, input device 504, user interface devices 510, and output device 512. Application 522 and driver 12 may also include program instructions and/or data that are executable by computing device 500.

In addition to or as an alternative to the above, the following examples are described. The features described in any of the following examples may be utilized with any of the other examples described herein.

Example 1. A method of automating model creation for a network device, the method comprising: conducting, by the one or more processors and based on configuration parameters for the network device, each of a plurality of simulation iterations within a test environment to collect corresponding operational data representative of an operating state of the network device; performing, by the one or more processors, a regression analysis with respect to each of the plurality of configuration parameters and each of the plurality of simulation datasets to generate a light weight model representative of the network device that predicts, responsive to the configuration parameters for the network device, an operating state of the network device when configured with the configuration parameters for the network device, the light weight model configured to consume, during execution of the light weight model, less computing resources compared to execution of a model generated using machine learning with respect to the configuration parameters and the corresponding operational data; and outputting, by the one or more processors, the light weight model for use in a computing resource restricted network device to enable prediction of the operating state of the computing resource restricted network device when configured with the configuration parameters.

Example 2. The method of example 1, wherein performing the regression analysis comprises: performing the regression analysis to identify a relationship, expressed as one or more coefficients, between the configuration parameters for the network device and the operating state of the network device; and configuring a regression model using the one or more coefficients to obtain the light weight model.

Example 3. The method of example 2, wherein performing the regression analysis comprises performing a polynomial regression analysis to identify the relationship, expressed as one or more polynomial coefficients and one or more intercepts, between the configuration parameters for the network device and the operating state of the network device, and wherein configuring the regression model comprises configuring a polynomial regression model using the one or more polynomial coefficients and the one or more intercepts to obtain the light weight model.

Example 4. The method of example 3, wherein the polynomial regression model includes polynomial basis functions used to define the relationship as a non-linear relationship, expressed as the one or more polynomial coefficients and the one or more intercepts, between the configuration parameters for the network device and the operating state of the network device.

Example 5. The method of any combination of examples 3 and 4, wherein the one or more polynomial coefficients include at most two polynomial coefficients to express the relationship between the configuration parameters for the network device and the operating state of the network device.

Example 6. The method of any combination of examples 2-5, wherein performing the regression analysis comprises performing the regression analysis to identify the relationship as a fit between the configuration parameters for the network device and the operating state of the network device within a threshold accuracy to ensure a stated accuracy.

Example 7. The method of any combination of examples 1-6, wherein outputting the light weight model comprises outputting the light weight model for installation on the computing resource restricted network device to enable prediction of the operating state of the network device relative to changes to the configuration parameters prior to committing the changes to the configuration parameters and only committing the changes to the configuration parameters when the changes to the configuration parameters are not predicted to result in the operating state of the network device exceeding a threshold operating state.

Example 8. The method of any combination of examples 1-7, wherein the computing resource restricted network device comprises a router having a control plane and a forwarding plane, and wherein the forwarding plane including a packet forwarding engine.

Example 9. The method of any combination of examples 1-8, wherein the operational data include resource utilization data indicative of resource utilization within the network device, and wherein the resource utilization data comprises one or more of the resource usage per control plane application executed by the network device during each simulation, and the memory usage in the PFE of the network device during each simulation.

Example 10. A device configured to automate model creation for a network device, the device comprising: one or more processors configured to: conduct, based on configuration parameters, each of a plurality of simulation iterations within the test environment to collect a corresponding plurality of simulation datasets representative of operating states of the network device; perform a regression analysis with respect to each of the plurality of configuration parameters and each of the plurality of simulation datasets to generate a light weight model representative of the network device that predicts, responsive to configuration parameters for the network device of the configuration parameters, an operating state of the network device when configured with the configuration parameters for the network device, the light weight model configured to consume, during execution of the light weight model, less computing resources compared to execution of a model generated using machine learning with respect to the configuration parameters and each of the plurality of simulation datasets; and output the light weight model for use in a computing resource restricted network device to enable prediction of the operating state of the computing resource restricted network device when configured with the configuration parameters; and a memory configured to store the light weight model.

Example 11. The device of example 10, wherein the one or more processors are, when configured to perform the regression analysis, configured to: perform the regression analysis to identify a relationship, expressed as one or more coefficients, between the configuration parameters for the network device and the operating state of the network device; and configure a regression model using the one or more coefficients to obtain the light weight model.

Example 12. The device of example 11, wherein the one or more processors are, when configured to perform the regression analysis, configured to perform a polynomial regression analysis to identify the relationship, expressed as one or more polynomial coefficients and one or more intercepts, between the configuration parameters for the network device and the operating state of the network device, and wherein the one or more processors are, when configured to configure the regression model, configured to configure a polynomial regression model using the one or more polynomial coefficients and the one or more intercepts to obtain the light weight model.

Example 13. The device of example 12, wherein the polynomial regression model includes polynomial basis functions used to define the relationship as a non-linear relationship, expressed as the one or more polynomial coefficients and the one or more intercepts, between the configuration parameters for the network device and the operating state of the network device.

Example 14. The device of any combination of claims 12 and 13, wherein the one or more polynomial coefficients include at most two polynomial coefficients to express the relationship between the configuration parameters for the network device and the operating state of the network device.

Example 15. The device of any combination of examples 11-14, wherein the one or more processors are, when configured to perform the regression analysis, configured to perform the regression analysis to identify the relationship as a fit between the configuration parameters for the network device and the operating state of the network device within a threshold accuracy to ensure a stated accuracy.

Example 16. The device of any combination of examples 10-15, wherein the one or more processors are, when configured to output the light weight model, configured to output the light weight model for installation on the computing resource restricted network device to enable prediction of the operating state of the network device relative to changes to the configuration parameters prior to committing the changes to the configuration parameters and only committing the changes to the configuration parameters when the changes to the configuration parameters are not predicted to result in the operating state of the network device exceeding a threshold operating state.

Example 17. The device of any combination of examples 10-16, wherein the computing resource restricted network device comprises a router having a control plane and a forwarding plane, and wherein the forwarding plane including a packet forwarding engine.

Example 18. The device of any combination of examples 10-17, wherein the operational data include resource utilization data indicative of resource utilization within the network device, and wherein the resource utilization data comprises one or more of the resource usage per control plane application executed by the network device during each simulation, and the memory usage in the PFE of the network device during each simulation.

Example 19. A non-transitory computer-readable storage medium having stored thereon instructions that, when executed to perform model creation for a network device, cause one or more processors to: conduct, based on configuration parameters, each of a plurality of simulation iterations within the test environment to collect a corresponding plurality of simulation datasets representative of operating states of the network device; perform a regression analysis with respect to each of the plurality of configuration parameters and each of the plurality of simulation datasets to generate a light weight model representative of the network device that predicts, responsive to configuration parameters for the network device of the configuration parameters, an operating state of the network device when configured with the configuration parameters for the network device, the light weight model configured to consume, during execution of the light weight model, less computing resources compared to execution of a model generated using machine learning with respect to the configuration parameters and each of the plurality of simulation datasets; and output the light weight model for use in a computing resource restricted network device to enable prediction of the operating state of the computing resource restricted network device when configured with the configuration parameters.

Example 20. A system comprising: a computing device comprising: one or more processors configured to: conduct, based on configuration parameters, each of a plurality of simulation iterations within the test environment to collect a corresponding plurality of simulation datasets representative of operating states of a first network device; perform a regression analysis with respect to each of the plurality of configuration parameters and each of the plurality of simulation datasets to generate a light weight model representative of the first network device that predicts, responsive to configuration parameters for the first network device of the configuration parameters, an operating state of the first network device when configured with the configuration parameters for the first network device, the light weight model configured to consume, during execution of the light weight model, less computing resources compared to execution of a model generated using machine learning with respect to the configuration parameters and each of the plurality of simulation datasets; and output the light weight model for use in a computing resource restricted network device to enable prediction of the operating state of the computing resource restricted network device when configured with the configuration parameters; and a memory configured to store the light weight model; and a second network device deployed in an operating environment in support of delivery of one or more services, the second network device comprising: an interface configured to receive configuration parameters; and one or more processors configured to: execute the light weight model to obtain, based on the configuration parameters, predicted operating state of the second network device; determine if the predicted operating state exceeds one or more operating state thresholds; and commit the configuration parameters only if the predicted operating state does not exceed the one or more operating state thresholds.

In this respect, the techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method of automating model creation for a network device, the method comprising:
conducting, by one or more processors and based on a plurality of configuration parameters for the network device, each of a plurality of simulation iterations within a test environment to collect a corresponding plurality of simulation datasets and corresponding operational data representative of an operating state of the network device;

performing, by the one or more processors, a regression analysis with respect to each of the plurality of configuration parameters and each of the plurality of simulation datasets to generate a light weight model representative of the network device that predicts, responsive to the configuration parameters for the network device, the operating state of the network device when configured with the configuration parameters for the network device, the light weight model configured to consume, during execution of the light weight model, less computing resources compared to execution of a model generated using machine learning with respect to the configuration parameters and the corresponding operational data; and outputting, by the one or more processors, the light weight model for installation on a computing resource restricted network device to enable prediction of an operating state of the computing resource restricted network device relative to changes to the configuration parameters prior to committing the changes to the configuration parameters and committing the changes to the configuration parameters when the changes to the configuration parameters are not predicted to result in the operating state of the computing resource restricted network device exceeding a threshold operating state, wherein the computing resource restricted network device comprises a router having a control plane and a forwarding plane, wherein the forwarding plane includes a packet forwarding engine, wherein the operational data include resource utilization data indicative of resource utilization within the network device, and wherein the resource utilization data comprises one or more of resource usage per control plane application executed by the control plane of the network device during each simulation, and resource usage in the packet forwarding engine of the network device during each simulation.

2. The method of claim 1, wherein performing the regression analysis comprises:

performing the regression analysis to identify a relationship, expressed as one or more coefficients, between the configuration parameters for the network device and the operating state of the network device; and configuring a regression model using the one or more coefficients to obtain the light weight model.

3. The method of claim 2, wherein performing the regression analysis comprises performing a polynomial regression analysis to identify the relationship, expressed as one or more polynomial coefficients and one or more intercepts, between the configuration parameters for the network device and the operating state of the network device, and wherein configuring the regression model comprises configuring a polynomial regression model using the one or more polynomial coefficients and the one or more intercepts to obtain the light weight model.

4. The method of claim 2, wherein performing the regression analysis comprises performing the regression analysis to identify the relationship as a fit between the configuration parameters for the network device and the operating state of the network device within a threshold accuracy to ensure a stated accuracy.

5. The method of claim 3, wherein the polynomial regression model includes polynomial basis functions used to define the relationship as a non-linear relationship, expressed as the one or more polynomial coefficients and the one or more intercepts, between the configuration parameters for the network device and the operating state of the network device.

6. The method of claim 3, wherein the one or more polynomial coefficients include at most two polynomial coefficients to express the relationship between the configuration parameters for the network device and the operating state of the network device.

7. A device configured to automate model creation for a network device, the device comprising:

one or more processors configured to:

conduct, based on a plurality of configuration parameters, each of a plurality of simulation iterations within a test environment to collect a corresponding plurality of simulation datasets that each include operational data representative of operating states of the network device;

perform a regression analysis with respect to each of the plurality of configuration parameters and each of the plurality of simulation datasets to generate a light weight model representative of the network device that predicts, responsive to particular configuration parameters for the network device, an operating state of the network device when configured with the particular configuration parameters for the network device, the light weight model configured to consume, during execution of the light weight model, less computing resources compared to execution of a model generated using machine learning with respect to the plurality of configuration parameters and each of the plurality of simulation datasets; and output the light weight model for installation on a computing resource restricted network device to enable prediction of an operating state of the computing resource restricted network device relative to changes to the configuration parameters prior to committing the changes to the configuration parameters and committing the changes to the configuration parameters when the changes to the configuration parameters are not predicted to result in the operating state of the computing resource restricted network device exceeding a threshold operating state, wherein the computing resource restricted network device comprises a router having a control plane and a forwarding plane, wherein the forwarding plane includes a packet forwarding engine, wherein the operational data include resource utilization data indicative of resource utilization within the network device, and wherein the resource utilization data comprises one or more of resource usage per control plane application executed by the control plane of the network device during each simulation, and resource usage in the packet forwarding engine of the network device during each simulation; and a memory configured to store the light weight model.

8. The device of claim 7, wherein the one or more processors are, when configured to perform the regression analysis, configured to:

perform the regression analysis to identify a relationship, expressed as one or more coefficients, between the configuration parameters for the network device and the operating state of the network device; and configure a regression model using the one or more coefficients to obtain the light weight model.

9. The device of claim 8, wherein the one or more processors are, when configured to perform the regression analysis, configured to perform a polynomial regression analysis to identify the relationship, expressed as one or more polynomial coefficients and one or more intercepts, between the configuration parameters for the network device and the operating state of the network device, and wherein the one or more processors are, when configured to configure the regression model, configured to configure a polynomial regression model using the one or more polynomial coefficients and the one or more intercepts to obtain the light weight model.

10. The device of claim 8, wherein the one or more processors are, when configured to perform the regression analysis, configured to perform the regression analysis to identify the relationship as a fit between the configuration parameters for the network device and the operating state of the network device within a threshold accuracy to ensure a stated accuracy.

11. The device of claim 9, wherein the polynomial regression model includes polynomial basis functions used to define the relationship as a non-linear relationship, expressed as the one or more polynomial coefficients and the one or more intercepts, between the configuration parameters for the network device and the operating state of the network device.

12. The device of claim 9, wherein the one or more polynomial coefficients include at most two polynomial coefficients to express the relationship between the configuration parameters for the network device and the operating state of the network device.

13. A non-transitory computer-readable storage medium having stored thereon instructions that, when executed to perform model creation for a network device, cause one or more processors to:

conduct, based on a plurality of configuration parameters, each of a plurality of simulation iterations within a test environment to collect a corresponding plurality of simulation datasets that each include operational data representative of operating states of the network device;

perform a regression analysis with respect to each of the plurality of configuration parameters and each of the plurality of simulation datasets to generate a light weight model representative of the network device that predicts, responsive to particular configuration parameters for the network device, an operating state of the network device when configured with the particular configuration parameters for the network device, the light weight model configured to consume, during execution of the light weight model, less computing resources compared to execution of a model generated using machine learning with respect to the plurality of configuration parameters and each of the plurality of simulation datasets; and output the light weight model for installation on a computing resource restricted network device to enable prediction of an operating state of the computing resource restricted network device relative to changes to the configuration parameters prior to committing the changes to the configuration parameters and committing the changes to the configuration parameters when the changes to the configuration parameters are not predicted to result in the operating state of the computing resource restricted network device exceeding a threshold operating state, wherein the computing resource restricted network device comprises a router having a control plane and a forwarding plane, wherein the forwarding plane includes a packet forwarding engine, wherein the operational data include resource utilization data indicative of resource utilization within the network device, and wherein the resource utilization data comprises one or more of resource usage per control plane application executed by the control plane of the network device during each simulation, and resource usage in the packet forwarding engine of the network device during each simulation.

14. A system comprising:

a computing device comprising:

one or more processors configured to:

conduct, based on a plurality of configuration parameters, each of a plurality of simulation iterations within a test environment to collect a corresponding plurality of simulation datasets that each include operational data representative of operating states of a first network device;

perform a regression analysis with respect to each of the plurality of configuration parameters and each of the plurality of simulation datasets to generate a light weight model representative of the first network device that predicts, responsive to particular configuration parameters for the first network device, an operating state of the first network device when configured with the particular configuration parameters for the first network device, the light weight model configured to consume, during execution of the light weight model, less computing resources compared to execution of a model generated using machine learning with respect to the plurality of configuration parameters and each of the plurality of simulation datasets; and output the light weight model for installation on a computing resource restricted network device to enable prediction of an operating state of the computing resource restricted network device relative to changes to the configuration parameters prior to committing the changes to the configuration parameters and committing the changes to the configuration parameters when the changes to the configuration parameters are not predicted to result in the operating state of the computing resource restricted network device exceeding a threshold operating state, wherein the computing resource restricted network device comprises a router having a control plane and a forwarding plane, wherein the forwarding plane includes a packet forwarding engine, wherein the operational data include resource utilization data indicative of resource utilization within the network device, and wherein the resource utilization data comprises one or more of resource usage per control plane application executed by the control plane of the network device during each simulation, and resource usage in the packet forwarding engine of the network device during each simulation; and a memory configured to store the light weight model; and a second network device deployed in an operating environment in support of delivery of one or more services including forwarding of network packets, the second network device comprising:

a hardware interface configured to receive the particular configuration parameters; and one or more processors configured to:

execute the light weight model to obtain, based on the particular configuration parameters, a predicted operating state of the second network device;

determine if the predicted operating state exceeds one or more operating state thresholds; and commit the particular configuration parameters only if the predicted operating state does not exceed the one or more operating state thresholds.

* * * * *